United States Patent
Xia et al.

(10) Patent No.: US 11,669,699 B2
(45) Date of Patent: *Jun. 6, 2023

(54) SYSTEMS AND METHODS FOR COMPOSED VARIATIONAL NATURAL LANGUAGE GENERATION

(71) Applicant: salesforce.com, inc., San Francisco, CA (US)

(72) Inventors: Congying Xia, Chicago, IL (US); Caiming Xiong, Menlo Park, CA (US)

(73) Assignee: saleforce.com, inc., San Francisco, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/010,465

(22) Filed: Sep. 2, 2020

(65) Prior Publication Data

US 2021/0374603 A1    Dec. 2, 2021

Related U.S. Application Data

(60) Provisional application No. 63/032,673, filed on May 31, 2020.

(51) Int. Cl.
| | |
|---|---|
| *G06F 40/56* | (2020.01) |
| *G06F 16/9032* | (2019.01) |
| *G06F 40/284* | (2020.01) |
| *G06N 20/00* | (2019.01) |
| *G06F 40/30* | (2020.01) |
| *G06N 7/01* | (2023.01) |

(52) U.S. Cl.
CPC ........ *G06F 40/56* (2020.01); *G06F 16/90332* (2019.01); *G06F 40/284* (2020.01); *G06F 40/30* (2020.01); *G06N 7/01* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 10,474,709 B2 | 11/2019 | Paulus | |
| 10,521,465 B2 | 12/2019 | Paulus | |

(Continued)

OTHER PUBLICATIONS

Li Dong et al., Unified Language Model Pre-training for Natural Language Understanding and Generation, Oct. 15, 2019, arXiv: 1905.03197v3, pp. 1-14 (Year: 2019).*

(Continued)

*Primary Examiner* — Antim G Shah
(74) *Attorney, Agent, or Firm* — Haynes and Boone, LLP

(57) ABSTRACT

Embodiments described herein provide a composed variational natural language generation (CLANG) model that is configured to generate training samples for few-shot intents. Specifically, the CLANG model may build connections between existing training samples of many-shot intents and new training samples of few-shot intents by modeling an intent as a combination of a domain and an action. In this way, the CLANG model transfers knowledge from existing many-shot intents to few-shot intents in natural language generation by learning how to compose utterances with many-shot intents and transferring such knowledge to few-shot intents.

20 Claims, 15 Drawing Sheets

(56) References Cited

U.S. PATENT DOCUMENTS

| | | | |
|---|---|---|---|
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,699,060 B2 | 6/2020 | McCann | |
| 10,747,761 B2 | 8/2020 | Zhong et al. | |
| 10,776,581 B2 | 9/2020 | McCann et al. | |
| 10,783,875 B2 | 9/2020 | Hosseini-Asl et al. | |
| 10,817,650 B2 | 10/2020 | McCann et al. | |
| 10,839,284 B2 | 11/2020 | Hashimoto et al. | |
| 10,846,478 B2 | 11/2020 | Lu et al. | |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0268287 A1 | 9/2018 | Johansen et al. | |
| 2018/0268298 A1 | 9/2018 | Johansen et al. | |
| 2018/0336453 A1 | 11/2018 | Merity et al. | |
| 2018/0373987 A1 | 12/2018 | Zhang et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Asl et al. | |
| 2019/0355270 A1 | 11/2019 | McCann et al. | |
| 2019/0362020 A1 | 11/2019 | Paulus et al. | |
| 2019/0362246 A1 | 11/2019 | Lin et al. | |
| 2020/0005765 A1 | 1/2020 | Zhou et al. | |
| 2020/0065651 A1 | 2/2020 | Merity et al. | |
| 2020/0084465 A1 | 3/2020 | Zhou et al. | |
| 2020/0089757 A1 | 3/2020 | Machado et al. | |
| 2020/0090033 A1 | 3/2020 | Ramachandran et al. | |
| 2020/0090034 A1 | 3/2020 | Ramachandran et al. | |
| 2020/0090049 A1* | 3/2020 | Aliper | G06V 20/69 |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175305 A1 | 6/2020 | Trott et al. | |
| 2020/0184020 A1 | 6/2020 | Hashimoto et al. | |
| 2020/0234113 A1 | 7/2020 | Liu | |
| 2020/0272940 A1 | 8/2020 | Sun et al. | |
| 2020/0273541 A1* | 8/2020 | Costello | G06N 3/0454 |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0301925 A1 | 9/2020 | Zhong et al. | |
| 2020/0302178 A1 | 9/2020 | Gao et al. | |
| 2020/0302236 A1 | 9/2020 | Gao et al. | |
| 2020/0334334 A1 | 10/2020 | Keskar et al. | |
| 2020/0364299 A1 | 11/2020 | Niu et al. | |
| 2020/0364542 A1 | 11/2020 | Sun | |
| 2020/0372116 A1 | 11/2020 | Gao et al. | |
| 2020/0372319 A1 | 11/2020 | Sun et al. | |
| 2020/0372339 A1 | 11/2020 | Che et al. | |
| 2020/0372341 A1 | 11/2020 | Asai et al. | |
| 2020/0380213 A1 | 12/2020 | McCann et al. | |
| 2021/0104231 A1* | 4/2021 | Jeon | G06F 40/30 |
| 2022/0245191 A1* | 8/2022 | Kashino | G06N 3/084 |

OTHER PUBLICATIONS

Ba et al. "Layer Normalization." Jul. 21, 2016.

Bowman et al. "Generating Sentences from a Continuous Space." Nov. 19, 2015.

Chawla et al. "Smote: Synthetic Minority Over-Sampling Technique." *Journal of Artificial Intelligence Research.* vol. 1. Issue 1. pp. 321-357.

Chen et al. "End-to-End Memory Networks with Knowledge Carryover for Multi-Turn Spoken Language Understanding." *Interspeech.* Sep. 8-12, 2016. pp. 3245-3249.

Chen et al. "Few-Shot NLG with Pre-Trained Language Model." Sep. 6, 2019.

Cho et al. "Contrastive Multi-Document Question Generation." Apr. 29, 2020.

Coucke et al. "Snips Voice Platform: An Embedded Spoken Language Understanding System for Private-by-Design Voice Interfaces." May 25, 2018.

Devlin et al. "BERT: Pre-training of Deep Bidirectional Transformers for Language Understanding." Oct. 11, 2018.

Dong et al. "Unified Language Model Pre-training for Natural Language Understanding and Generation." Oct. 15, 2019.

Geng et al. "Induction Networks for Few-Shot Text Classification." *Proceedings of the 2019 Conference on Empirical Methods in Natural Language Processing and the 9th International Joint Conference on Natural Language Processing.* Sep. 29, 2019. pp. 3895-3904.

Gutmann et al. "Noise-Contrastive Estimation: A New Estimation Principle for Unnormalized Statistical Models." *Proceeding of the Thirteenth International Conference on Artificial Intelligence and Statistics.*

Hendrycks et al. "Bridging Nonlinearities and Stochastic Regularizers with Gaussian Error Linear Units." Jun. 27, 2016.

Hochreiter et al. "Long Short-Term Memory." *Neural Computation.* vol. 9. Issue 8. Dec. 1997. pp. 1735-1780.

Hoy. Alexa, Siri, "Cortana and More: An Introduction to Voice Assistants." *Medical Reference Services Quarterly.* vol. 37. Issue 1. Jan. 2018. pp. 81-88.

Hu et al. "Toward Controlled Generation of Text." *Proceedings of the 34th International Conference on Machine Learning.* Journal of Machine Learning Research. vol. 70. Jul. 11, 2017. pp. 1587-1596.

Hu et al. "Understanding User's Query Intent with Wikipedia." WWW2009. Apr. 20-24, 2009. pp. 471-480.

IBM Watson Assistant. "Defining Intents." https://cloud.ibm/docs/assisant-data?topic=assistant-data-intents.

Kingma et al. "Adam: A Method for Stochastic Optimization." Dec. 22, 2014.

Kingma et al. "Auto-Encoding Variational Bayes." Dec. 27, 2013.

Kingma et al. "Semi-Supervised Learning with Deep Generative Models." Proceedings of Neural Information Processing Systems, Oct. 31, 2014. pp. 3581-3589.

Li et al. "One-Shot Learning of Object Categories." IEEE Transaction on Pattern Analysis and Machine Intelligence, vol. 28. No. 24. Apr. 2006. pp. 594-611.

Liu et al. "Benchmarking Natural Language Understanding Services for building Conversational Agents." *Proceedings of the Tenth International Workshop on Spoken Dialogue Systems Technology.* Mar. 26, 2019.

Malandrakis et al. "Controlled Text Generation for Data Augmentation in Intelligent Artificial Agents." Oct. 4, 2019.

Mikolov et al. "Distributed Representations of Words and Phrases and their Compositionality." *Advances in Neural Information Processing Systems.* Oct. 16, 2013. pp. 3111-3119.

Peng et al. "Few-shot Natural Language Generation for Task-Oriented Dialog." Feb. 27, 2020.

(56) References Cited

OTHER PUBLICATIONS

Snell et al. "Prototypical Networks for Few-shot Learning." *Advances in Neural Information Processing Systems.* Jun. 19, 2017. pp. 4077-4087.
Tran et al. "Dual Latent Variable Model for Low-Resource Natural Language Generation in Dialogue Systems." Nov. 10, 2018.
Vaswani et al. "Attention is All You Need." Advances in Neural Information Processing Systems. Dec. 6, 2017. pp. 5998-6008.
Wu et al. "Google's Neural Machine Translation System: Bridging the Gap between Human and Machine Translation." Oct. 8, 2016.
Xia et al. "CG-BERT: Conditional Text Generation with BERT for Generalized Few-shot Intent Detection." Apr. 4, 2020.
Xian et al. "Zero-Shot Learning—The Good, the Bad and the Ugly." *Proceedings of the IEEE Conference on Computer Vision and Pattern Recognition.* Mar. 13, 2017. pp. 4582-4591.
Xu et al. "Convolutional Neural Network Based Triangular CRF for Joint Intent Detection and Slot Filling." *IEEE Workshop on Automatic Speech Recognition and Understanding.* Dec. 2013. pp. 78-83.
Yoo et al. "Data Augmentation for Spoken Language Understanding via Joint Variational Generation." *Proceedings of the AAAI Conference on Artificial Intelligence.* Jul. 17, 2019. pp. 7402-7409.
Zhao et al. "Learning Discourse-level Diversity for Neural Dialog Models using Conditional Variational Autoencoders." Oct. 21, 2017.

\* cited by examiner

700 obtain, via an input interface, from a training dataset for a language model, an utterance associated with an intent of a domain and an action 702 convert the utterance and the intent into an input sequence of tokens 704 apply, by a bi-latent variable encoder, an attention mask that prevents a first token representing the domain and a second token representing the action from the input sequence from attending to each other 706 generate a first latent variable corresponding to the first token and a second latent variable corresponding to the second token, which are disentangled from each other 708 output, to a decoder, an encoded sequence of tokens including at least the first latent variable and the second latent variable 710

```
┌─────────────────────────────────────────────────────────────┐
│ receive an in-class training sample and an out-of-class training │
│ sample for the first intent token and the second intent token 918 │
└─────────────────────────────────────────────────────────────┘
                              ↓
┌─────────────────────────────────────────────────────────────┐
│ Select an out-of-class training sample from a set of training │
│ samples, that is similar to the in-class training sample and │
│ corresponds to an intent other than the first intent token or the │
│ second intent token 920                                      │
└─────────────────────────────────────────────────────────────┘
                              ↓
┌─────────────────────────────────────────────────────────────┐
│ encode the in-class training sample with the first intent token and │
│ the second intent token into a first encoded sequence, and the out- │
│ of-class training sample with the first intent token and the second │
│ intent token into a second encoded sequence, respectively 922 │
└─────────────────────────────────────────────────────────────┘
                              ↓
┌─────────────────────────────────────────────────────────────┐
│ generate a reconstructed in-class sample from the first encoded │
│ sequence and a reconstructed out-of-class sample from the second │
│ encoded sequence, respectively 926                           │
└─────────────────────────────────────────────────────────────┘
                              ↓
┌─────────────────────────────────────────────────────────────┐
│ sequentially generate each token in the reconstructed in-class │
│ sample or in the reconstructed out-of-class sample 928       │
└─────────────────────────────────────────────────────────────┘
                              ↓
┌─────────────────────────────────────────────────────────────┐
│ sequentially compute a first conditional probability of the  │
│ reconstructed in-class sample and a second conditional probability │
│ of a reconstructed out-of-class sample, both conditioned on the │
│ first intent token and the second token 930                  │
└─────────────────────────────────────────────────────────────┘
                              ↓
┌─────────────────────────────────────────────────────────────┐
│ compute a contrastive loss by constraining a logarithm of the first │
│ conditional probability to be higher than that of the second │
│ conditional probability for at least a pre-defined margin 932 │
└─────────────────────────────────────────────────────────────┘
```

FIG. 9

| Dataset | SNIPS-NLU | NLUED |
|---|---|---|
| Vocab Size | 10,896 | 6,761 |
| #Total Classes | 7 | 64 |
| #Few-shot Classes | 2 | 16 |
| #Few-shots / Class | 1 or 5 | 1 or 5 |
| #Training Examples | 7,858 | 7,430 |
| #Training Examples / Class | 1571.6 | 155 |
| #Test Examples | 2,799 | 1,076 |
| Average Sentence Length | 9.05 | 7.68 |

FIG. 10

| | Many-shot | Few-shot | H-Mean | Many-shot | Few-shot | H-Mean |
|---|---|---|---|---|---|---|
| | SNIPS-NLU 1-shot | | | SNIPS-NLU 5-shot | | |
| BERT-PN+ | 92.66 ± 4.49 | 60.52 ± 7.58 | 72.99 ± 5.97 | 95.96 ± 1.13 | 86.03 ± 2.00 | 90.71 ± 1.19 |
| BERT | 98.20 ± 0.06 | 44.42 ± 4.35 | 57.74 ± 7.50 | 98.34 ± 0.10 | 81.82 ± 6.16 | 89.22 ± 3.74 |
| BERT + SVAE | 98.24 ± 0.09 | 45.15 ± 5.54 | 61.67 ± 5.11 | 98.34 ± 0.06 | 82.10 ± 4.06 | 89.49 ± 2.47 |
| BERT + CGT | 98.20 ± 0.07 | 45.80 ± 5.68 | 62.30 ± 5.17 | 98.32 ± 0.14 | 82.65 ± 4.31 | 89.78 ± 2.83 |
| BERT + EDA | 98.20 ± 0.08 | 47.52 ± 5.96 | 63.87 ± 5.29 | 98.09 ± 0.18 | 82.00 ± 3.47 | 89.30 ± 2.12 |
| BERT + CG-BERT | 98.13 ± 0.15 | 63.04 ± 5.49 | 76.65 ± 4.24 | 98.30 ± 0.17 | 86.89 ± 4.05 | 92.20 ± 2.32 |
| BERT + CLANG | 98.34 ± 0.10 | 64.63 ± 6.16 | 77.86 ± 4.39 | 98.34 ± 0.06 | 88.04 ± 1.34 | 92.90 ± 0.71 |
| | NLUED 1-shot | | | NLUED 5-shot | | |
| BERT-PN+ | 81.24 ± 2.76 | 18.95 ± 4.42 | 30.67 ± 5.53 | 83.41 ± 2.62 | 60.28 ± 4.19 | 69.93 ± 3.49 |
| BERT | 94.00 ± 0.93 | 7.88 ± 3.28 | 14.39 ± 5.66 | 94.12 ± 0.89 | 51.69 ± 3.19 | 66.67 ± 2.51 |
| BERT + SVAE | 93.80 ± 0.70 | 8.88 ± 3.66 | 16.01 ± 6.06 | 93.60 ± 0.63 | 54.03 ± 3.91 | 68.42 ± 3.06 |
| BERT + CGT | 94.00 ± 0.66 | 9.33 ± 3.68 | 16.78 ± 6.16 | 93.61 ± 0.63 | 54.70 ± 4.06 | 68.96 ± 3.17 |
| BERT + EDA | 93.78 ± 0.66 | 11.65 ± 4.89 | 20.41 ± 7.56 | 93.71 ± 0.64 | 57.22 ± 4.35 | 70.95 ± 3.35 |
| BERT + CG-BERT | 94.01 ± 0.70 | 20.39 ± 5.77 | 33.12 ± 7.92 | 93.80 ± 0.60 | 61.06 ± 4.29 | 73.88 ± 3.10 |
| BERT + CLANG | 93.60 ± 0.79 | 22.03 ± 6.10 | 35.29 ± 8.05 | 93.29 ± 0.86 | 66.44 ± 3.07 | 77.56 ± 2.05 |

*FIG. 11*

|  | Many-shot | Few-shot | H-Mean |
|---|---|---|---|
|  | NLUED 1-shot | | |
| CLANG | 93.60 ± 0.79 | 22.03 ± 6.10 | 35.29 ± 8.05 |
| $-\mathcal{L}_v$ | 93.88 ± 0.84 | 21.76 ± 6.44 | 34.92 ± 8.48 |
|  | NLUED 5-shot | | |
| CLANG | 93.29 ± 0.86 | 66.44 ± 3.07 | 77.56 ± 2.05 |
| $-\mathcal{L}_v$ | 92.94 ± 0.72 | 65.26 ± 2.95 | 76.64 ± 2.06 |

FIG. 12

|  | Total | $Novel_d$ | $Novel_a$ | $Dual_s$ | $Dual_u$ |
|---|---|---|---|---|---|
| Number | 16 | 4 | 8 | 3 | 1 |
| CG-BERT | 58.76% | 47.76% | 60.43% | 67.34% | 63.16% |
| CLANG | 67.88% | 68.66% | 62.58% | 75.51% | 84.21% |
| +Improve | 9.12% | 20.90% | 2.15% | 8.17% | 21.05% |

FIG. 13

| |
|---|
| Intent: Alarm Query |
| R1: what time is my alarm set for tomorrow morning |
| G1: what time is my alarm set for ⟦this weekend⟧ |
| B1: ⟦how much⟧ my alarm set for tomorrow morning |
| R2: i need to set an alarm how many do i have set |
| G2: do i have ⟦an alarm set for tomorrow morning⟧ |
| B2: how many ⟦emails⟧ i have set |
| Intent: Recommendation Movies |
| R3 (events): is there anything to do tonight |
| G3 (movies): ⟦are there anything movie tonight⟧ |
| R4 (events): what bands are playing in town this weekend |
| B4 (movies): ⟦what bands are playing in town this weekend⟧ |
| Intent: Takeaway Order |
| R5: places with pizza delivery near me |
| G5: ⟦search for the⟧ delivery near me |
| B5: ⟦compose⟧ a delivery near me |
| G6: places with pizza delivery near ⟦my location⟧ |
| B6: places with pizza delivery near ⟦my pizza⟧ |

FIG. 14

| Type | Count | Percent |
|---|---|---|
| Add/Delete/Replacement | 33 | 27.27% |
| New Time slot | 30 | 24.79% |
| New Question | 28 | 23.14% |
| Combination | 7 | 5.79% |
| Total Good Cases | 98 | 80.99% |
| Wrong Intent (Query) | 10 | 8.26% |
| Wrong Intent (Alarm) | 7 | 5.79% |
| Wrong Question | 6 | 4.96% |
| Total Bad Cases | 23 | 19.01% |

FIG. 15

SYSTEMS AND METHODS FOR COMPOSED VARIATIONAL NATURAL LANGUAGE GENERATION

CROSS-REFERENCES

The present disclosure is a non-provisional application of and claims priority under 35 U.S.C. 119 to U.S. provisional application No. 63/032,673, filed on May 31, 2020, which is hereby expressly incorporated by reference herein in its entirety.

TECHNICAL FIELD

The present disclosure relates generally to machine learning models and neural networks, and more specifically, to composed variational natural language generation.

BACKGROUND

Neural networks have been used to generate conversational responses and thus conduct a dialogue with a human user. For example, a human user can engage in a conversation with an intelligent assistant to gather information on a specific topic, to perform a task such as booking travel tickets, making restaurant reservations, and/or the like. Given the broad scope and diversity of a user natural language input to the intelligent assistant, providing an effective answer can often be challenging. For example, identifying user intentions from a user spoken input has proven to be both essential and important for the intelligent assistant to generate an effective natural language response. However, most existing systems formulate intent detection as a classification task and rely on supervised learning for this classification task. Such intent detection systems thus require large amounts of labeled examples for each class for training, which can be both expensive and time-consuming.

In addition, the requirements on labeled training data limits the adaptability to previously unseen classes. For example, available training data for a natural language model may be highly imbalanced with dialogues data of existing many-shot intents but insufficient training dialogue data of few-shot intents. Thus, the resulting training result may heavily discriminate against few-shot intents and thereby lead to unsatisfactory performance of the language model that is trained with the imbalanced training data.

BRIEF DESCRIPTION OF THE DRAWINGS

FIGS. 7A-7B provides a simplified flow diagram illustrating a process of using the CLANG model described in FIG. 4 to learn how to compose an utterance for a specific intent, according to embodiments described herein.

FIG. 9 provides a simplified flow diagram illustrating a process of contrastive learning, according to embodiments described herein.

FIG. 10 provides an example data table showing the dataset details of SNIPS-NLU and NLUED, according to embodiments described herein.

FIG. 11 shows an example data table illustrating the performance of CLANG compared with various baseline few-shot baseline learning model and several data augmentation methods, according to embodiments described herein.

FIG. 12 provides an example data table illustrating results for an ablation study of removing the contrastive loss from CLANG on NLUED, according to embodiments described herein.

FIG. 13 provides an example data table illustrating accuracies on different types of few-shot intents comparing CLANG with different baseline models, according to embodiments described herein.

FIG. 14 provides a diagram illustrating generation examples from the CLANG model. CLANG can generate good examples (indicated by G) that have new slots values (like time, place, or action) not existing in the few-shot examples (indicated by R), according to embodiments described herein.

FIG. 15 provides an example data table illustrating a generation case study for the intent of "Alarm Query," according to embodiments described herein.

In the figures and appendix, elements having the same designations have the same or similar functions.

DETAILED DESCRIPTION

Existing intelligent dialogue systems usually formulate intent detection as a classification task and rely on supervised learning for this classification task. Such intent detection systems thus require large amounts of labeled examples for each class for training, which can be both expensive and time-consuming. Such systems also generate training data samples that are largely biased towards many-shot intents but fail to provide sufficient training samples with few-shot intents.

In view of the need for providing a balanced training dataset with both many-shot intents and few-shot intents, embodiments described herein provide a composed variational natural language generation (CLANG) model that is configured to generate training samples for few-shot intents. Specifically, the CLANG model may build connections between existing training samples of many-shot intents and new training samples of few-shot intents by modeling an intent as a combination of a domain and an action. The CLANG model may then encode the intent of the domain and the action by a transformer-based conditional variational autoencoder. Specifically, two latent variables are utilized to represent two different portions of an input utterance, each portion corresponding to the domain or the action in the intent. The latent variables are then composed together to generate natural examples with few-shot intents. In this way, the CLANG model transfers knowledge from existing many-shot intents to few-shot intents in natural language generation by learning how to compose utterances with many-shot intents and transferring such knowledge to few-shot intents.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

Figure 1:
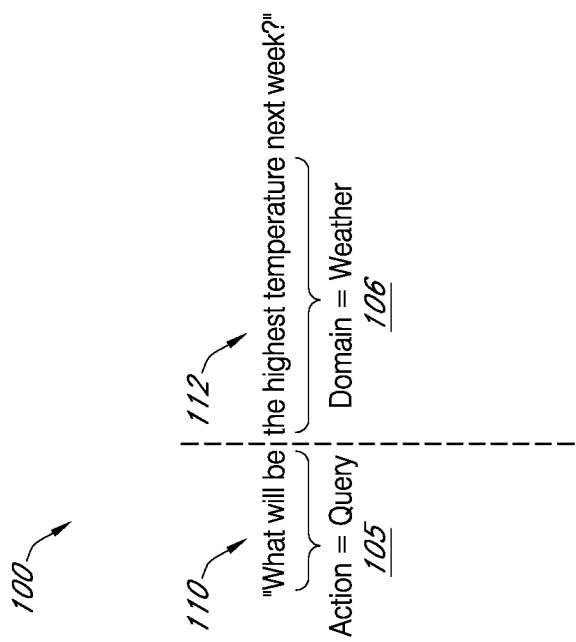
FIG. 1 is an example diagram illustrating an input utterance associated with an intent represented by the domain component and the action component, according to one embodiment described herein.

FIG. 1 is an example diagram illustrating an input utterance associated with an intent represented by the domain component and the action component, according to one embodiment described herein. Diagram 100 shows an utterance "what will be the highest temperature next week." When users interact with intelligent assistants, the users may attempt to query some information or execute a command in a certain domain. The intent of the input "what will be the highest temperature next week" is to ask about the weather. The utterance can be decomposed into two parts: the first part "what will be" 110 corresponds to an action "Query" 105 and "the highest temperature" 112 related to the domain "Weather" 106. These actions or domains are very likely to be shared among different intents including the few-shot intents.

For example, various actions such as "query", "set", "remove," and/or the like can be combined with the domain of "weather" to form various different intents. The action "query" can also be associated with multiple domains such as "weather", "calendar," "movie" and/or the like. Thus, if a neural model may learn how the expressions representing for a certain action or domain can compose an utterance for existing intents, then the neural model can be used to learn how to compose utterances for few-shot intents.

Figure 2A:
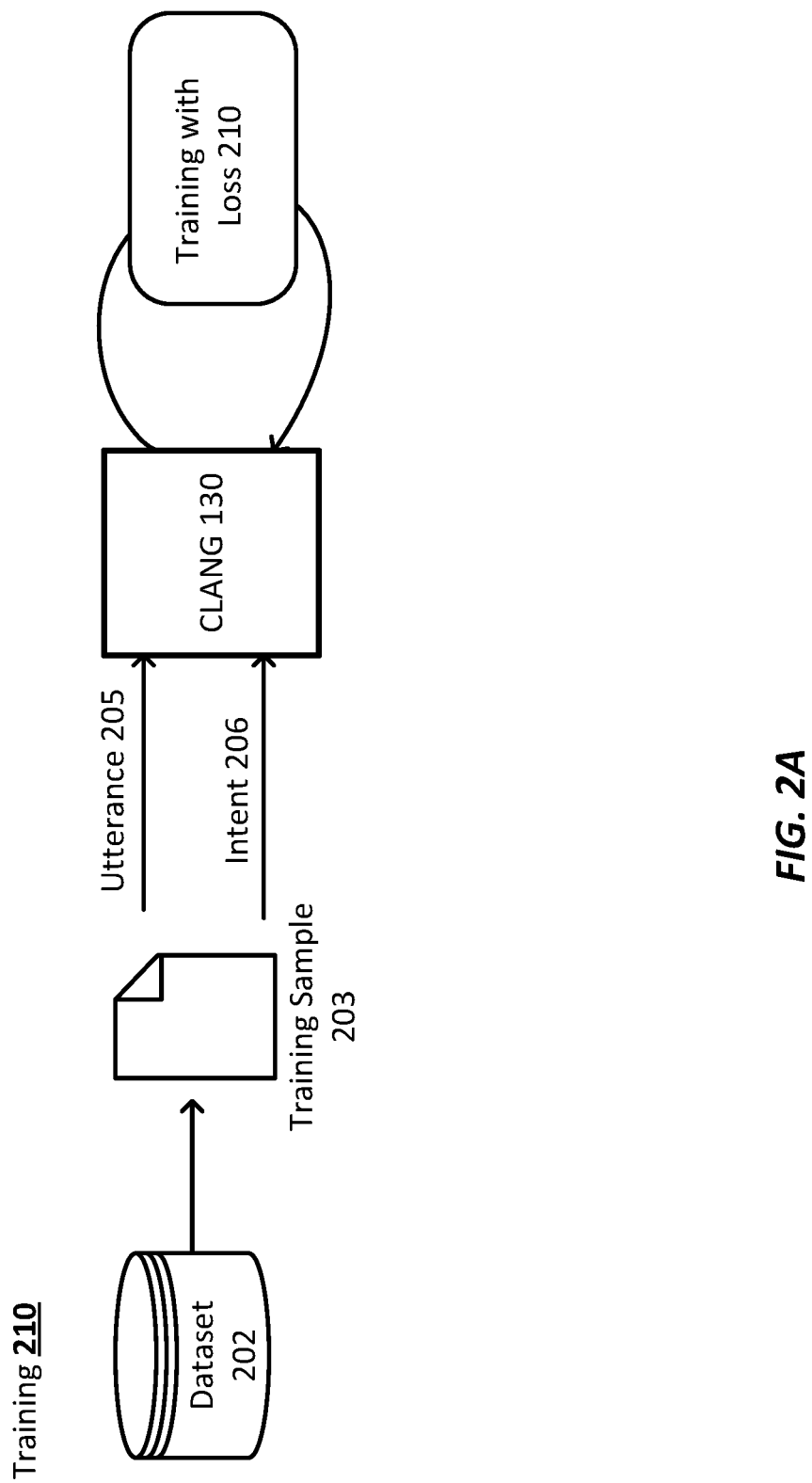
FIG. 2A provides an example block diagram illustrating a composed variational natural language generation (CLANG) model being trained with training samples of many-shot intents to learn how an utterance is composed for an existing intent, according to one embodiments described herein.

FIG. 2A provides an example block diagram illustrating a CLANG model being trained with training samples of many-shot intents to learn how an utterance is composed for an existing intent, according to one embodiments described herein. The CLANG model 130, as described throughout this application, is adopted to learn how to compose an utterance for a given intent with an action and a domain. For example, as shown in FIG. 2A, during the training stage 210 of the CLANG model 130, a training sample 203 may be obtained from the training dataset 202. The training sample 203 may include an utterance 205 (e.g., "what will be the highest temperature next week") and the pre-annotated intent 206 (e.g., action="Query," domain="Weather"). The utterance 105 and the intent 106 (including the domain and the action) may then be passed to the CLANG model 130, which is a transformer-based conditional variational auto-encoder including a bi-latent variational encoder and a decoder.

Specifically, the bi-latent variational encoder in the CLANG model 130 utilizes two independent latent variables to model the distributions of action and domain separately. At the encoder, special attention masks are designed to guide these two latent variables to focus on different parts of the utterance 205 (e.g., "what will be" 110 that relates to the action 105 and "the highest temperature next week" 112 that relates to the domain 106) and disentangle the semantics for action and domain separately. Through decomposing utterances for existing many-shot intents by training with losses at 110, the CLANG model 130 learns to generate utterances for few-shot intents as a composition of the learned expressions for domain and action. Further details of the framework of the CLANG model 130 is described in relation to FIG. 4.

Additionally, the training 210 of the CLANG model 130 further adopts a contrastive regularization loss to improve learning. For example, during the training 210, an in-class utterance (e.g., the utterance that specifically corresponds to a certain intent) from one intent may be contrasted with an out-of-class utterance (e.g., an utterance that does not match with the one intent) from another intent. Specifically, the contrastive loss is to constrain the model to generate the positive example with a higher probability than the negative example with a certain margin. With the contrastive loss, the CLANG model 130 is regularized to focus on the given domain and intent and the probability of generating negative examples is reduced. Further detail of the contrastive learning is provided in FIGS. 8-9.

Figure 2B:
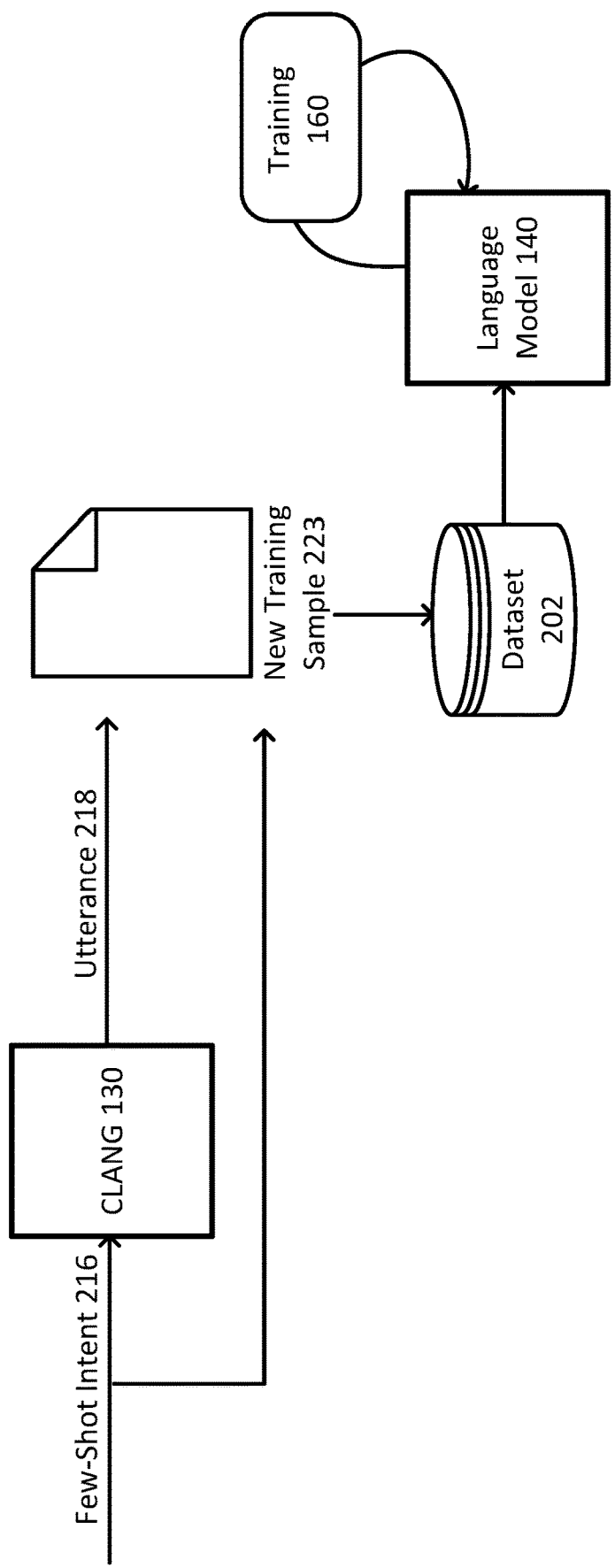
FIG. 2B provides an example block diagram illustrating the CLANG model generating training samples for a given few-shot intent during inference, according to one embodiments described herein.

FIG. 2B provides an example block diagram illustrating the CLANG model generating training samples for a given few-shot intent during inference, according to one embodiments described herein. As discussed in FIG. 2A, each intent is a combination of a domain and an action to build connections between existing many-shot intents 206 and few-shot intents 216. After the training stage 210, during the inference 220, given a (few-shot) intent 216, the CLANG model 130 is configured to generate an utterance 218, based on the trained parameters obtained from the training stage 210. In this way, utterances are generated for few-shot intents via a composed variational inferences process. The generated utterance 218, together with the given few-shot intent 216, forms a new training sample 223 that can be added to the training dataset 202. Thus, the original training dataset 202 is augmented with training samples with few-shot intents. The augmented dataset 202 can then be used to train a language model 140, e.g., at training process 160, to result in better performance for conducting dialogues with diverse intents.

Computer Environment

Figure 3:
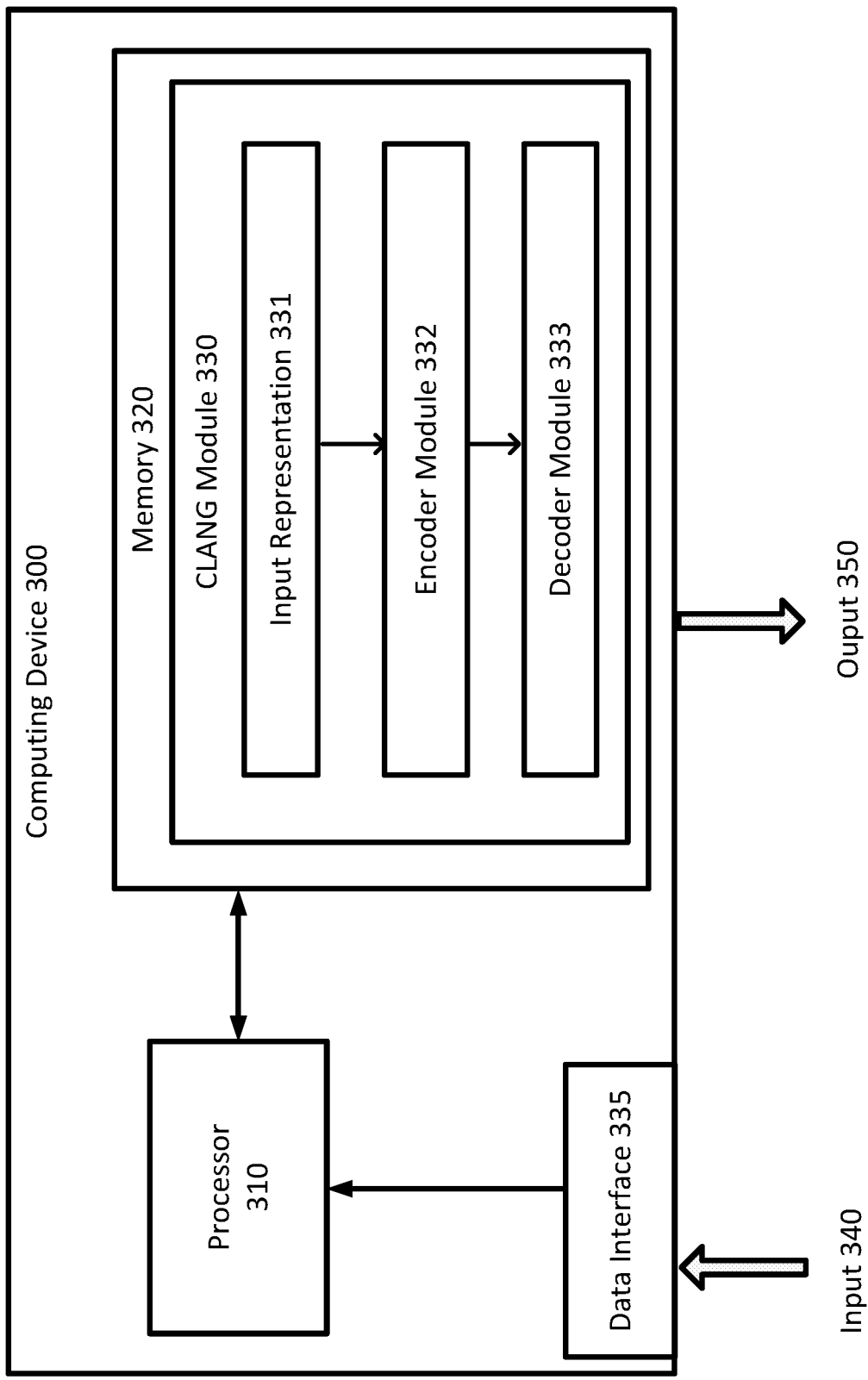
FIG. 3 is a simplified diagram of a computing device for implementing a CLANG model, according to some embodiments.

FIG. 3 is a simplified diagram of a computing device for implementing a CLANG model, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a CLANG module 330 that may be used to implement and/or emulate the systems and models, and/or to implement any of the methods described further herein. In some examples, the CLANG module 330 may include an input representation submodule 331, an encoder module 332 and a decoder module 333. The submodules 331-333 may be optionally sequentially connected as shown in FIG. 3 or connected in other ways.

Specifically, the input representation submodule 331 is configured to receive an input 340 of an utterance via the data interface 335, e.g., from a database of training data. The input representation may then generate a sequence of token representation for the input 340 of the utterance and its associated intent. The encoder submodule 332 is a conditional autoencoder with dual latent variables that encode the intent domain and intent action. During the training, the CLANG module 330 reconstructs the utterance from input 340 with a certain intent via the decoder module 333, e.g., to output an output 350 of a reconstructed utterance. During inference of the CLANG module 330, the CLANG module 330 generates utterances associated with a given intent through sampling the latent variables at the decoder submodule 333. The output 350 during inference may include an utterance generated given a specific (e.g., few-shot) intent. Further detail of the submodules 331-333 can be found in relation to FIG. 4.

In some embodiments, to learn the distinctiveness for each intent, an additional contrastive loss may be used by the CLANG module 330 during training to push the CLANG model 330 to generate the positive examples over the negatives. The input 340 may then include positive (in-class) samples and negative (out-of-class) samples corresponding to a specific intent. Both samples may be passed to the CLANG module 330 to generate an output 350 of a conditional distribution of utterances conditioned on the specific intent. The output 350 may then be used to learn the contrastive loss. Further details of the contrastive learning may be discussed in relation to FIG. 8.

In some examples, the CLANG module 330 and the sub-modules 331-333 may be implemented using hardware, software, and/or a combination of hardware and software.

Composed Variational Natural Language Generator (CLANG)

Figure 4:
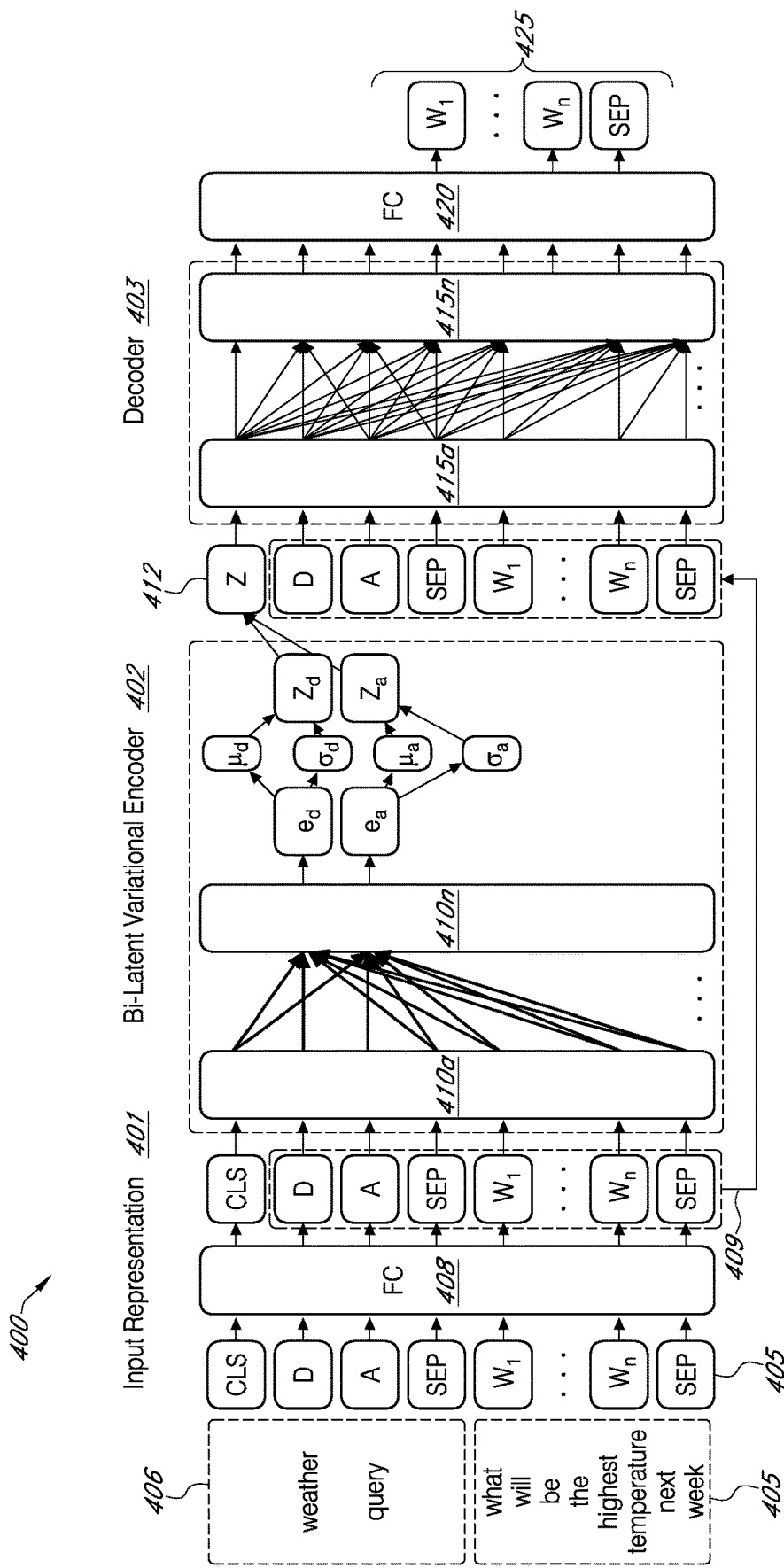
FIG. 4 is a simplified diagram illustrating an example architecture of the CLANG model shown in FIGS. 2A-2B, or the CLANG module shown in FIG. 3, according to some embodiments described herein.

FIG. 4 is a simplified diagram 400 illustrating an example architecture of the CLANG model 130 shown in FIGS. 2A-2B, or the CLANG module 330 shown in FIG. 3, according to some embodiments described herein. Diagram 400 shows the CLANG module includes an input representation module 401 (similar to submodule 331 in FIG. 3), a bi-latent variational encoder 402 (similar to submodule 332 in FIG. 3), a decoder 403 (similar to submodule 333 in FIG. 3), and/or the like.

The input representation module 401 is configured to convert an input utterance 405 (e.g., "what will be the highest temperature next week") and the associated intent 406 (e.g., domain="Weather," action="query") which may be pre-annotated with the input utterance into an input representation of tokens 409. For example, the intent 406 may include a combination of a domain and an action, denoted by $y=(y_d, y_a)$. Then for a given intent $y=(y_d, y_a)$ and an utterance $x=(w_1, w_2, \ldots, w_n)$ with n tokens, the input representation module 401 concatenates the intent tokens and the utterance tokens, and further adds a special start-of-sequence ([CLS]) token at the beginning of the input and a special end-of-sequence ([SEP]) token at the end of each part. The resulting input sequence 407 may take a form as ([CLS], $y_d$, $y_a$, [SEP], $w_1$, $w_2$, \ldots, $w_n$, [SEP]). As the example in FIG. 4, the input is represented as ([CLS], weather, query, [SEP], what, will, be, the, highest, temperature, next, week, [SEP]).

In some embodiments, [SEP] not only marks the sentence boundary, but also is used for the model to learn when to terminate the decoding process.

In some embodiments, input texts may be tokenized into subword units by a fully-connected layer 408. For example, the tokenization may be performed by Word-Piece as described in Wu et al., Google's neural machine translation system: Bridging the gap between hu-man and machine translation. arXiv preprint arXiv:1609.08144, 2016, which is hereby expressly incorporated by reference herein in its entirety. The input embeddings of a token sequence may be represented as the sum of three embeddings: token embeddings, position embeddings (see Vaswani et al., Attention is all you need. In Advances in neural information pro-cessing systems, pages 5998-6008, 2017), and segment embeddings (Devlin et al., BERT: Pre-training of deep bidirectional transformers for language understanding, arXiv preprint arXiv:1810.04805, 2018). The segment embeddings are learned to identify the intent and the utterance with different embeddings. The resulting tokenized sequence 409 may be output from the input representation module 401 to the bi-latent variational encoder 402.

The bi-latent variational encoder 402 is configured to encode the input sequence representation of tokens 409 into two latent variables that contain the disentangled semantics in the utterance corresponding to domain and action separately. Specifically, the bi-lantent variational encoder 402 includes multiple transformer layers 410a-n. The transformer layers may be similar to the Transformer model described in Vaswani et al. Through a self-attention mechanism, these transformer layers 410a-n extract semantic meaningful representations for the tokens from the input representation sequence 409, and also model the relation between the intent 406 (the "D" token and "A" token in input representation 409) and the utterance 405 (the "$W_1 \ldots W_n$" tokens in input representation 409).

Specifically, the information for the domain and the action is kept disentangled through the self-attention mechanism in the multiple transformer layers 410a-n, e.g., allowing the domain token (represented by "D" in the input sequence 409) to only attend to tokens related to the domain and the action token (represented by "A" in the input sequence 409) to only attend to tokens related to the action. To achieve that, a variation of the attention calculations in the transformer layers 410a-n is adopted to avoid direct interactions between the domain token and the action token in each transformer layer 410a-n.

For example, instead of applying a whole bidirectional attention to the input sequence 409, an attention mask matrix $M \in \mathbb{R}^{N \times N}$ is added at each transformer layer 410a-n to determine whether a pair of tokens can be attended to each other, where N is the length of the input sequence 409. Thus, for the l-th Transformer layer, the output of a self-attention head $A_l$ is computed via:

$$Q = T^{l-1} W_Q^l,$$

$$K = T^{l-1} W_K^l,$$

$$V = T^{l-1} W_V^l,$$

$$A_l = \text{softmax}\left(\frac{QK^T}{\sqrt{d_k}} + M\right)V,$$

where $T^{l-1} \in \mathbb{R}^{N \times d_h}$ is the output of the previous (l-1)-th transformer layer. The output of the previous transformer layer is then linearly projectted to a triple of queries Q, keys K, and values V parameterized by matrices $W_Q^l, W_K^l, W_V^l \in \mathbb{R}^{d_h \times d_k}$, where $d_h$ is the hidden dimension for the transformer layer and $d_k$ is the hidden dimension for a self-attention head for the transformer layer. The attention mask matrix is then calculated as:

$$M_{i,j} = \begin{cases} 0, & \text{allow to attend;} \\ -\infty, & \text{prevent from attending} \end{cases}.$$

Figure 5:
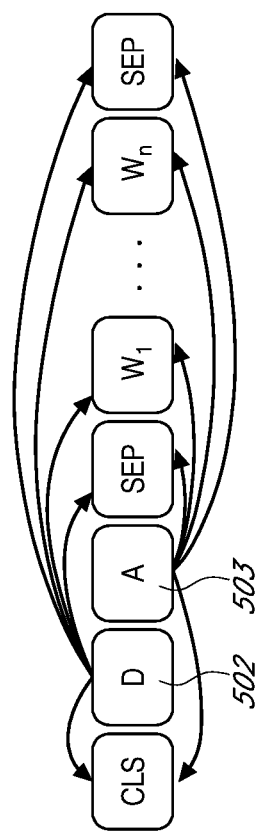
FIG. 5 provides a simplified diagram illustrating the proposed attention mechanism for the domain token and the action token, according to some embodiments described herein.
Figure 6:
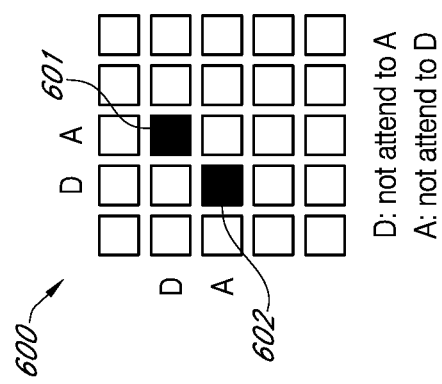
FIG. 6 provides a simplified diagram illustrating attention mask for the domain token and the action token, according to some embodiments described herein.

For example, FIG. 5 provides a simplified diagram 500 illustrating the proposed attention mechanism for the domain token 502 and the action token 503. As shown in FIG. 5, the domain token 502 and the action token 503 are prevented from attending to each other. All the other tokens are allowed to have full attentions. FIG. 6 provides a simplified diagram illustrating attention mask matrix 600 M for the domain token 502 and the action token 503. The elements 601, 602 in the mask matrix 600 for the attentions between domain and action are $-\infty$ (shown in the shaded entry), and 0 (unshaded entries) for all the other entries in the mask matrix 600.

With reference to FIG. 4, the multiple transformer layers 410a-n are configured to output embeddings for the domain token (represented by "D" in sequence 409) and the action token (represented by "A" in sequence 409) from the last transformer layer 410n of the multiple layers, denoted as $e_d$ and $e_a$. The bi-latent variational encoder 402 is then configured to encode the disentangled embeddings $e_d$ into variable $z_d$ and encode $e_a$ into variable $z_a$ to the posterior distributions determined by the intent elements separately: $q(z_d|x,y_d), q(z_d|x,y_a)$. The latent variable $z_d$ is conditioned on the domain $y_d$, while $z_a$ is controlled by the action $y_a$. By modeling the true distributions, $q(z_d|x,y_d), q(z_d|x,y_a)$, using a known distribution that is easy to sample, the prior distributions $p(z_d|y_d), p(z_d|y_a)$ can be constrained as multivariate standard Gaussian distributions. For example, the latent vector $z_d$ and $z_a$ may be generated via reparametrization, using Gaussian parameters $(\mu_d, \mu_a, \sigma_d^2, \sigma_a^2)$ that are projected from the embeddings $e_d$ and $e_a$:

$$\mu_d = e_d W_{\mu_d} + b_{\mu_d},$$

$$\log(\sigma_d^2) = e_d W_{\sigma_d} + b_{\sigma_d},$$

$$\mu_a = e_a W_{\mu_a} + b_{\mu_a},$$

$$\log(\sigma_a^2) = e_a W_{\sigma_a} + b_{\sigma_a},$$

where the parameters $W_{\mu_d}, W_{\mu_a}, W_{\sigma_d}, W_{\sigma_a} \in \mathbb{R}^{d_h \times d_h}, b_{\mu_d}, b_{\mu_a}, b_{\sigma_d}, b_{\sigma_a} \in \mathbb{R}^{d_h}$ are parameters of the encoder. Noisy variables, $\varepsilon_d \mathcal{N}(0,1) \varepsilon_a \sim \mathcal{N}(0,1)$ are utilized to sample the variables $z_d$ and $z_a$ from the learned distributions:

$$z_d = \mu_d + \sigma_d \cdot \varepsilon_d,$$

$$z_a = \mu_a + \sigma_a \cdot \varepsilon_a.$$

In one embodiment, the bi-latent variational encoder may compute a KL-loss function to regularize the prior distributions for the two latent variables to be close to the Gaussian distribution. For example, the encoder loss is computed based on a KL-loss between the conditional distribution of the first latent variable $z_d$ conditioned on the first intent token $y_d$ and a fourth conditional distribution of the first latent variable $z_d$ conditioned on both the first intent token $y_d$ and the training sequence of tokens x, and a second KL-loss between the second conditional distribution of the second latent variable $z_a$ conditioned on the second intent token $y_a$ and a fifth conditional distribution of the second latent variable $z_a$ conditioned on both the second intent token $y_a$ and the training sequence of tokens. Specifically, the encoder KL-loss can be computed by:

$$\mathcal{L}_{kL} = \mathbb{D}_{KL}[q(z_d|x,y_d), p(z_d|y_d)] + \mathbb{D}_{KL}[q(z_a|x,y_a), p(z_a|y_a)].$$

In one embodiment, the bi-latent variational encoder 402 includes a fully connected layer with a Gelu activation function. The GeLu activation function is similar to that described in Hendrycks et al., Bridging nonlinearities and stochastic regularizers with gaussian error linear units, arXiv preprint arXiv:1606.08415, 2016, which is hereby expressly incorporated herein by reference in its entirety. The fully-connected layer is applied to compose the two latent variables together and outputs z at the encoded sequence 412. The composed latent information z is utilized in the decoder to do generation.

The decoder 403 receives the composed latent information z together with the intent to reconstruct the input utterance $p(x|z_d, z_a, y_d, y_a)$. As shown in FIG. 4, a residual connection is built from the input representation 409 to the decoder 403 to get the embeddings for all the tokens. To keep a fixed length and introduce the composed latent information z into the decoder 403, the first [CLS] token in the input representation 409 is replaced with z to form the decoder input representation 412.

The decoder 403 is built with multiple transformer layers 415a-n to reconstruct the utterance. It is worth noting that two transformer layers 415a-n are illustrated in FIG. 4 for illustrative purpose only, but any number of transformer layers other than two may be used.

Specifically, the decoder 403 may sequentially generate a text output from the left to the right, e.g., the left context is used to predict the next token. To simulate the left-to-right generation process, the multiple transformer layers 415a-b employs an attention mask. In the attention mask for the decoder, tokens in the intent can only attend to intent tokens, while tokens in the utterance can attend to both the intent and all the left tokens in the utterance. For example, for the first token z which holds composed latent information, the decoder 403 only attend the first token to itself due to the vanishing latent variable problem. The latent information can be overwhelmed by the information of other tokens when adapting VAE to natural language generators either for LSTM or Transformers. To further increase the impact of the composed latent information z and alleviate the vanishing latent variable problem, the token representations of z is concatenated to all the other token embeddings output from the last transformer layer in the decoder 403.

The hidden dimension of the output from the last transformer layer 415n at decoder 403 may increases to $2 \times d_h$ after the concatenation. To reduce the hidden dimension to $d_h$ and get the embeddings to decode the vocabulary, the decoder 403 further employs two fully-connected (FC) layers 420 followed by an optional layer normalization on top of the transformer layers 415a-n. For example, GeLu is used as the activation function at the fully-connected layers 420, and the optional normalization layer may be similar to the layer normalization described in Ba et al., Layer normalization. arXiv preprint arXiv:1607.06450, 2016, which is hereby expressly incorporated by reference herein in its entirety.

The embeddings output from these two FC layers 420 are decoded into tokens 425 in the vocabulary sequentially. For example, the embeddings at position $i=\{1, \ldots, n-1\}$ are used to predict the next token at position i+1 till the [SEP] token is generated.

In one embodiment, to train the decoder to reconstruct the input, a reconstruction loss is formulated as:

$$\mathcal{L}_r = -\mathbb{E}_{q(z_d|x,y_d),q(z_a|x,y_a)}[\log p(x|z_d,z_a,y_d,y_a)].$$

Figure 7B:
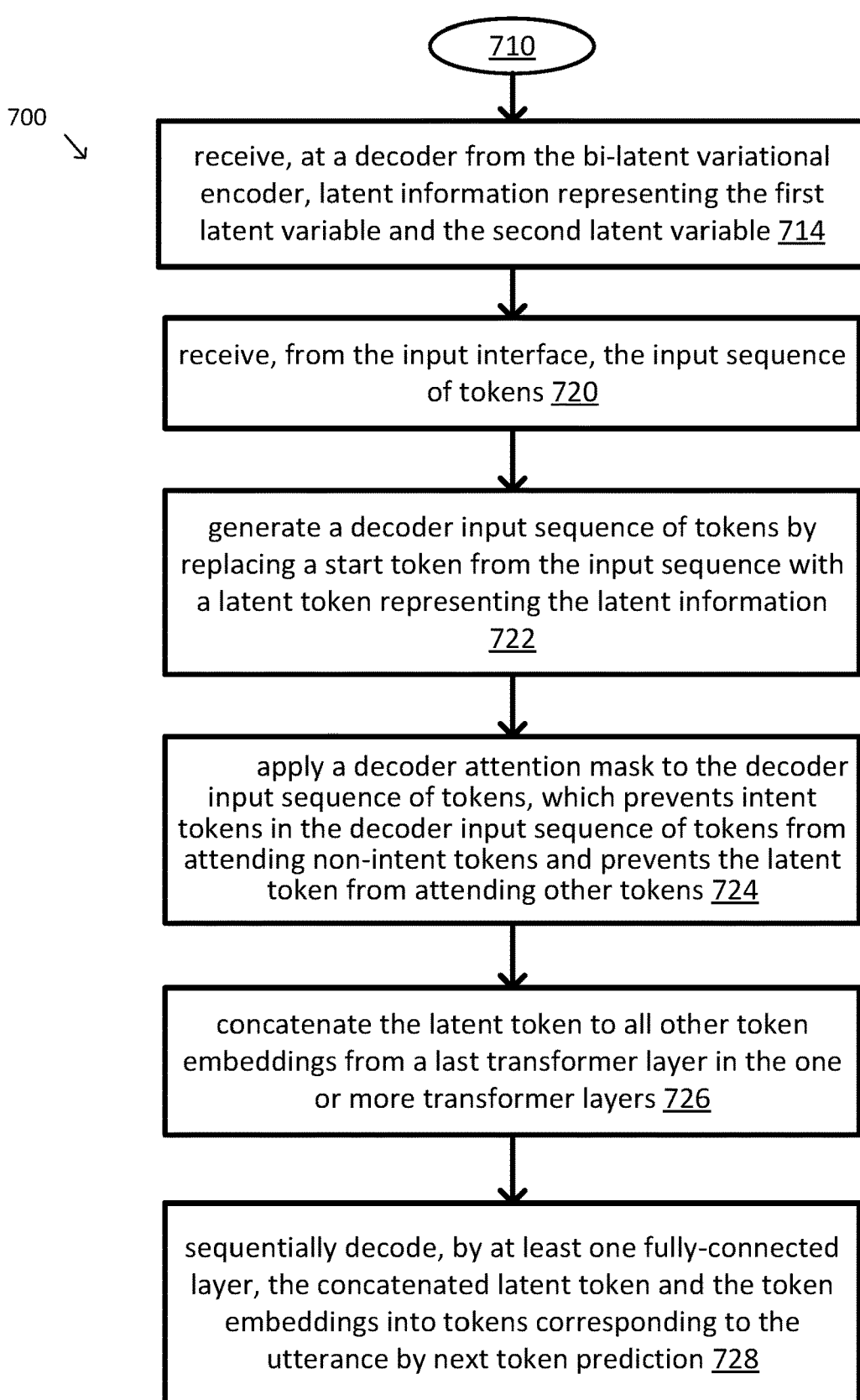

FIGS. 7A-7B provides a simplified flow diagram illustrating a process 700 of using the CLANG model described in FIG. 4 to learn how to compose an utterance for a specific intent, according to embodiments described herein. One or more of the subprocesses 702-728 of process 700 may be implemented, at least in part, in the form of executable code stored on non-transitory, tangible, machine-readable media that when run by one or more processors may cause the one or more processors to perform one or more of the processes 702-728. In some embodiments, process 700 may correspond to the method used by the module 330 in FIG. 3 and the CLANG framework 400 in FIG. 4.

At subprocess 702, the CLANG model obtains, via an input interface (e.g., data interface 335 in FIG. 3), from a training dataset (e.g., dataset 202 in FIG. 2A) for a language model, an utterance associated with an intent of a domain and an action.

At subprocess 704, the CLANG model converts the utterance and the intent into an input sequence of tokens. For example, as shown in FIG. 4, the utterance 405 and the intent 406 are concatenated with a start token [CLS] and separation tokens [SEP] to form the input sequence 408. In some implementations, the input sequence of tokens are further tokenized into subword units forming the input representation 409.

At subprocess 706, the CLANG model applies, by a bi-latent variable encoder, an attention mask that prevents a first token representing the domain and a second token representing the action from the input sequence from attending to each other. For example, as shown in FIGS. 5-6, the attention mechanism in the encoder prevents the domain token from attending the action token, and vice versa.

At subprocess 708, the CLANG model generates a first latent variable corresponding to the first token and a second latent variable corresponding to the second token. The first latent variable, e.g., $z_d$, and the second latent variable, e.g., $z_a$, are disentangled from each other conditioned on the domain and the action, respectively.

At subprocess 710, the CLANG model outputs, to the decoder (e.g., decoder 403 in FIG. 4), an encoded sequence of tokens (e.g., 412 in FIG. 4) including at least the first latent variable and the second latent variable.

At subprocess 714, the CLANG model receives, at a decoder from the bi-latent variational encoder, latent information representing the first latent variable and the second latent variable. For example, as described in relation to FIG. 4, in some implementations, the first latent variable and the second latent variable may be combined into one vector carrying the latent information.

At subprocess 720, the CLANG model receives, from the input interface, the input sequence of tokens. For example, the original input sequence 409 is also fed to the decoder 403.

At subprocess 722, the CLANG model generates a decoder input sequence of tokens by replacing a start token (e.g., the [CLS] token) from the input sequence with a latent token representing the latent information.

At subprocess 724, the CLANG model applies a decoder attention mask to the decoder input sequence of tokens. Specifically, the decoder attention mask prevents intent tokens in the decoder input sequence of tokens from attending non-intent tokens and prevents the latent token from attending other tokens.

At subprocess 726, the CLANG model concatenates the latent token to all other token embeddings from a last transformer layer in the one or more transformer layers.

At subprocess 728, the CLANG model sequentially decodes, by at least one fully-connected layer, the concatenated latent token and the token embeddings into tokens corresponding to the utterance by next token prediction. For example, the embeddings at position $i=\{1, \ldots, n-1\}$ are used to predict the next token at position i+1 till the [SEP] token is generated.

Contrastive Learning

Figure 8:
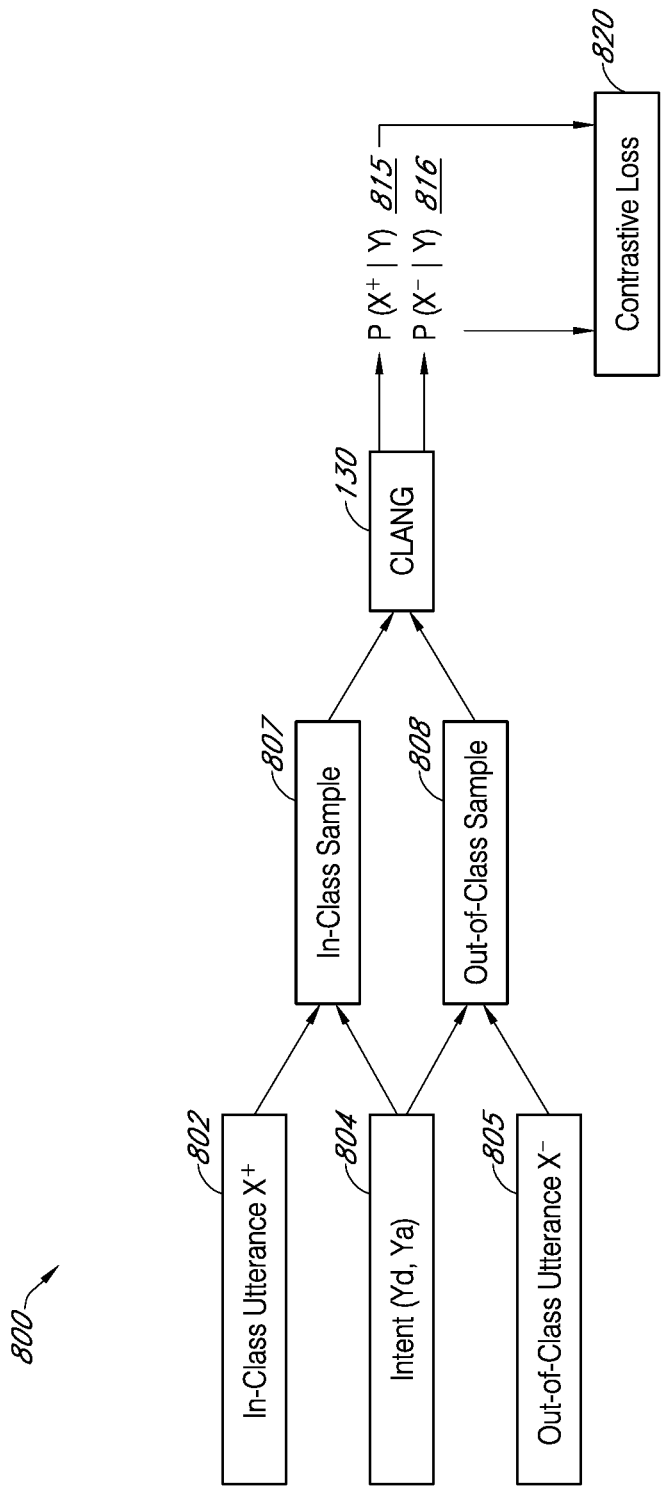
FIG. 8 provides a simplified block diagram illustrating using the CLANG model with contrastive learning, according to embodiments described herein.

FIG. 8 provides a simplified block diagram 800 illustrating using the CLANG model with contrastive learning, according to embodiments described herein. Although the CLANG model 130 can generate utterances for a given intent, such as "are there any alarms set for seven am" for the given intent "Alarm Query," the CLANG model 130 may sometimes generate the negative utterances, e.g., utterances that do not strictly correspond to the given intent. For example, for the given intent "Alarm Query," sometimes the utterance "am I free between six to seven pm" can be generated, which does not correspond to the intent of "Alarm Query." This may be because in the training, the CLANG model 130 lacks supervision to distinguish in-class examples (e.g., an utterance that matches with a given intent) from out-of-class examples (e.g., an utterance that does not match with the given intent) especially for few-shot intents. Diagram 800 shows contrastive learning in training the CLANG model 130, which generates a contrastive loss in the objective function to train the CLANG model 130, which may reduce the chance to generate out-of-class samples.

Given an intent $y=(y_d, y_a)$ 804, an in-class utterance x+ 802 corresponding to this intent and an out-of-class utterance x− 805 from another intent may be obtained, e.g., received from a dataset via the input interface 335 in FIG. 3. The in-class utterance x+ 802 may then be paired with the given intent 804 to form an in-class training sample 807, and the out-of-class utterance x− 805 may be paired with the given intent 804 to form an out-of-class training sample 808. Both of the in-class and out-of-class samples 807 and 808 are passed to the CLANG model 130.

Thus, in the same batch of training data, the in-class example 807 ($y_d$, $y_a$, x+) and the out-of-class example 808 ($y_d$, $y_a$, x−) into the CLANG model 130 to model the likelihood: P(x+|y) 815 and P(x−|y) 816. Specifically, the chain rule is used to calculate the likelihood of the whole utterance: $p(x|y)=p(w_1|y)p(w_2|y, w_1) \ldots p(w_n|y, w_1, \ldots, w_{n-1})$. In the contrastive loss, the log-likelihood of the in-class example 807 is constrained to be higher than the out-of-class example 808 with a certain margin k, and thus the contrastive loss 802 is computed as:

$$\mathcal{L}_c = \max\{0, \lambda - \log p(x^+|y) + \log p(x^-|y)\}.$$

In this way, for a given intent, the contrastive loss 820 constrains the CLANG model 130 to generate the in-class example x+ with a higher probability than the out-of-class example x−.

To generate out-of-class utterances 805 for contrastive learning, an utterance, from a set of utterances in the training dataset, which is the most similar to an in-class utterance but with a different intent is chosen as the out-of-class utterance. Three indicators are considered to measure the similarity between the in-class utterance and other utterances having different intents in the training dataset: the number of shared uni-grams $s_1$ between the in-class utterance and another utterance, the number of shared bi-grams $s_2$ between the in-class utterance and another utterance, and the number of shared uni-grams between the name of the given intent associated with the in-class utterance and the name of the different intent associated with another utterance intents, denoted by $s_3$. The sum of these three numbers, $s=s_1+s_2+s_3$, is utilized to find the out-of-class utterance with the highest similarity. If there are multiple utterances having the same highest similarity, the out-of-class utterance may be randomly selected from the multiple utterances.

In some embodiments, the overall loss function is a summation of the KL-loss, the reconstruction loss and the contrastive loss:

$$\mathcal{L} = \mathcal{L}_{KL} + \mathcal{L}_r + \mathcal{L}_c.$$

The CLANG model may be trained end-to-end by the overall loss function, e.g., via backpropagation.

FIG. 9 provides a simplified flow diagram illustrating a process 900 of contrastive learning, according to embodiments described herein. One or more of the subprocesses 918-932 of process 900 may be implemented, at least in part, in the form of executable code stored on non-transitory, tangible, machine-readable media that when run by one or more processors may cause the one or more processors to perform one or more of the processes 918-932. In some embodiments, process 900 may correspond to the method used by the module 330 in FIG. 3 and the CLANG framework 400 in FIG. 4.

At subprocess 918, the CLANG model receives an in-class training sample (e.g., 807 in FIG. 8) and an out-of-class training sample (e.g., 808 in FIG. 8) for the first intent token and the second intent token (e.g., intent 804 in FIG. 8).

At subprocess 920, the out-of-class training sample is generated by selecting, from a set of training samples, a training sample that is similar to the in-class training sample and corresponds to an intent other than the first intent token or the second intent token. For example, the selected training sample has a similarity with the in-class training sample based on a first number of shared unigrams between the selected training sample and the in-class training sample, a second number of shared bi-grams between the selected training sample and the in-class training sample, and a third number of shared uni-grams between names of intents corresponding to the selected training sample and the in-class training sample.

At subprocess 922, the CLANG model encodes the in-class training sample with the first intent token and the second intent token into a first encoded sequence, and the out-of-class training sample with the first intent token and the second intent token into a second encoded sequence, respectively. For example, the encoding may be similar to embodiments of encoder 401 described in relation to FIG. 4.

At subprocess 926, the CLANG model generates a reconstructed in-class sample from the first encoded sequence and a reconstructed out-of-class sample from the second encoded sequence, respectively. For example, the reconstruction may be similar to embodiments described in relation to decoder 403 in FIG. 4.

At subprocess 928, the CLANG model sequentially generates each token in the reconstructed in-class sample or in the reconstructed out-of-class sample. For example, the utterance of tokens 425 may be sequentially generated via next token prediction.

At subprocess 930, the CLANG model sequentially computes a first conditional probability of the reconstructed in-class sample and a second conditional probability of a reconstructed out-of-class sample, both conditioned on the first intent token and the second token. For example, as the reconstructed in-class sample or the out-of-class sample is sequentially generated, the chain rule is used to calculate the likelihood of the whole utterance sequentially: $p(x|y)=p(w_1|y)p(w_2|y, w_1) \ldots p(w_n|y, w_1, \ldots, w_{n-1})$.

At subprocess 932, the CLANG model computes a contrastive loss by constraining a logarithm of the first conditional probability to be higher than that of the second conditional probability for at least a pre-defined margin. The contrastive loss, together with the encoder loss and decoder reconstruction loss, may be used to update the CLANG model, e.g., via backpropagation.

Few-Shot Intent Detection and Performance

Utterances for few-shot intents can be generated by sampling two latent variables, $z_d$ and $z_a$, separately from multivariate standard Gaussian distributions. Beam search may be applied to do the generation. To improve the diversity of the generated utterances, the latent variables may be sampled for s times and the top k results are stored for each time. The sampled latent variables are then sent to the decoder 403 in FIG. 4 to generate an utterance. These generated utterances are then added to the original training dataset to alleviate the scarce annotation problem. A language model, such as BERT, may then be fine-tuned with the augmented dataset to solve the generalized few-shot intent detection task. The whole pipeline is referred as BERT+CLANG in the performance evaluation experiments below.

Specifically, for performance evaluation of CLANG, two public intent detection datasets are used in the experiments: SNIPS-NLU (Coucke et al., Snips voice plat-form: an embedded spoken language understanding system for private-by-design voice interfaces, arXiv preprint arXiv: 1805.10190, 2018) and NLUED (Liu et al., Benchmarking natural language understanding services for building conversa-tional agents, in Proceedings of the Tenth International Workshop on Spoken Dialogue Systems Tech-nology (IWSDS), Ortigia, Siracusa (SR), Italy, 2019). These two datasets contain utterances from users when interacting with intelligent assistants and are annotated with pre-defined intents.

FIG. 10 provides an example data table showing the dataset details of SNIPS-NLU and NLUED. For example, SNIPS-NLU contains seven intents in total. Two of them (RateBook and AddToPlaylist) as regraded as few-shot intents. The others are used as existing intents with sufficient annotation. 80% of the whole data is randomly chosen as the training data and 20% as the test data. NLUED2 is a natural language understanding dataset with 64 intents for human-robot interaction in home domain, in which 16 intents as randomly selected as the few-shot ones. A sub-corpus of 11,036 utterances with 10-folds cross-validation splits is utilized.

FIG. 11 shows an example data table illustrating the performance of CLANG compared with various baseline few-shot baseline learning model and several data augmentation methods, including 1) Prototypical Network (PN), which is a distance-based few-shot learning model, and can be extended to the GFSID task naturally by providing the prototypes for all the intents. BERT is used as the encoder for PN to provide a fair comparison. BERT is then fine-tuned together with the PN model. This variation referred to as BERT-PN+. 2) BERT. For this baseline, the few-shot intents are over-sampled by duplicating the few-shots to the maximum training examples for one class. 3) SVAE, which is a variational autoencoder built with LSTMs. 4) CGT which adds a discriminator based on SVAE to classify the sentence attributes. 5) EDA which uses simple data augmentations rules for language transformation. In addition, three rules in the experiment, including insert, delete and swap. 6) CG-BERT which is the first work that combines CVAE with BERT to do few-shot text generation. BERT is fine-tuned with the augmented training data for these generation baselines. The whole pipelines are referred to as BERT+SVAE, BERT+CGT, BERT+EDA and BERT+CG-BERT. An ablation study is also provided to understand the importance of contrastive loss by removing it from CLANG.

Specifically, both the encoder and the decoder of the CLANG model 130 use six trans-former layers. Pre-trained weights from BERT-base are used to initialize the embeddings and the transformer layers. The weights from the first six layers in BERT-base are used to initialize the transformer layers in the encoder and the later six layers are used to initialize the decoder. The margin for the contrastive loss is 0.5 for all the settings. All the hidden dimensions used in CLANG is 768. For CLANG, the learning rate is 1e-5 and the batch size is 16. Each epoch has 1000 steps. Fifty examples from the training data are sampled as the validation set. The reconstruction error on the validation set is used to search for the number of training epochs in the range of [50, 75, 100]. The reported performances of CLANG and the ablation of contrastive loss are both trained with 100 epochs.

The hyperparameters for the generation process including the top index k and the sampling times s are chosen by evaluating the quality of the generated utterances. search s is performed in the list of [10, 20], and k in the list of [20, 30]. For example, k=30 and s=20 for BERT+CLANG in NLUED, while use k=30 and s=10 for all the other experiments. When fine-tuning BERT for the GF-SID task, the hyperparameters are chosen as follows: the batch size is 32, learning rate is 2e-5 and the number of the training epochs is 3.

As shown in FIG. 11, performance is reported for two datasets with both 1-shot and 5-shot settings. For SNIPS-NLU, the performance is calculated with the average and the standard deviation over 5 runs. The results on NLUED are reported over 10 folds. Three metrics are used to evaluate the model performances, including the accuracy on existing many-shot intents ($acc_m$), the accuracy on few-shot intents ($acc_f$) together with their harmonic mean (H). As the harmonic mean of $acc_m$ and $acc_f$, H is calculated as: $H=2\times(acc_m \times acc_f)/(acc_m+acc_f)$. The harmonic mean may be chosen as the evaluation criteria instead of the arithmetic mean because the overall results are significantly affected by the many-shot class accuracy $acc_m$ over the few-shot classes $acc_f$ in arithmetic mean. Instead, the harmonic mean is high only when the accuracies on both many-shot and few-shot intents are high. Due to this discrepancy, the harmonic mean which takes a weighted average of the many-shot and few-shot accuracy is evaluated.

As illustrated in FIG. 11, the pipeline BERT+CLANG achieves superior performance on the accuracy for many-shot intents, few-shot intents, and their harmonic mean for the SNIPS-NLU dataset. As for the NLUED dataset, BERT+CLANG outperforms all the baselines on the accuracy for few-shot intents and the harmonic mean, while achieves comparable results on many-shot intents compared with the best baseline. As the many-shot intents have sufficient training data, the improvement mainly comes from few-shot intents with scarce annotation. For example, the accuracy for few-shot intents on NLUED with the 5-shot setting improves 5% from the best baseline (BERT+CG-BERT).

Therefore, compared to the few-shot learning method, CLANG achieves better performance consistently in all the settings. In contrast, BERT-PN+may achieve decent performance on many-shot intents but lacks the ability to provide embeddings that can be generalized from existing intents to few-shot intents.

For data augmentation baselines, CLANG obtains the best performance on few-shot intents and the harmonic mean. These results demonstrate the high quality and diversity of the utterances generated form CLANG. CGT and SVAE barely improve the performance for few-shot intents. They only work well with sufficient training data. The utterances generated by these two models are almost the same as the few-shot examples. The performance improved by EDA is also limited since it only provides simple language transformation like insert and delete. Compared with CG-BERT that incorporates the pre-trained language model BERT, CLANG further improves the ability to generate utterances for few-shot intents with composed natural language generation.

FIG. 12 provides an example data table illustrating results for an ablation study of removing the contrastive loss from CLANG on NLUED. As shown in FIG. 12, the accuracy for few-shot intents and the harmonic mean decreases. It shows that the contrastive loss regularizes the generation process and contributes to the downstream classification task.

FIG. 13 provides an example data table illustrating accuracies on different types of few-shot intents comparing CLANG with different baseline models. The fold 7 of the NLUED dataset with the 5-shot setting as an example is used, which contains 16 novel intents with 5 examples per intent. As described above, the intent is defined as a pair of a domain and an action. Thus, the domain or the action might be shared among the many-shot intents and the few-shot intents. The domain/action that exists in many-shot intents is named as a seen domain/action, otherwise, it is called a novel do-main/action. Few-shot intents are further split into four types: a novel domain with a seen action (Noveld), a novel action with a seen domain (Novela), both domain and action are seen (Duals), both domain and action are novel (Dualu). Thus, the CLANG model is compared with CG-BERT on these different types. As illustrated in FIG. 13, CLANG consistently performs better than CG- BERT on all the types. The performance for intents with a seen action and a novel domain improves 20.90%. This observation indicates that CLANG is better at generalizing seen actions into novel domains.

As a few-shot natural language generation model, diversity is a very important indicator for quality evaluation. The percentage of unique utterances generated by CLANG is then compared with CG-BERT. In CG-BERT, the top 20 results are generated for each intent by sampling the hidden variable for once. There are 257 unique sentences out of 320 utterances (80.3%). In CLANG, the top 30 results for each intent are generated by sampling the latent variables for once. Thus, CLANG generates 479 unique sentences out of 480 utterances (99.8%), which is much higher than CG-BERT.

FIG. 14 provides a diagram illustrating generation examples from the CLANG model. CLANG can generate good examples (indicated by G) that have new slots values (like time, place, or action) not existing in the few-shot examples (indicated by R). For example, G1 has a new time slot and G5 has a new action. Bad cases (indicated by B) like B1 and B5 fill in the sentence with improper slot values. CLANG can also learn sentences from other intents. For instance, G3 transfer the expression in R3 from "Recommendation Events" to "recommendation movies". However, B4 fails to transfer R4 into the movie domain.

FIG. 15 provides an example data table illustrating a generation case study for the intent of "Alarm Query." There are 121 unique utterances generated in total. As shown in FIG. 16, 80.99% are good examples and 19.01% are bad cases. Good cases mainly come from four types: Add/Delete/Replacement which provides simple data augmentation; New Time slot that has a new time slot value; New Question that queries alarm in new question words; Combination that combines two utterances together. Bad cases either come from a wrong intent (intents related to Query or Alarm) or use a wrong question word.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for training a composed variational natural language generator implemented on a neural network, the system comprising:

an input interface configured to receive a training sequence of tokens including a first intent token and a second intent token;

a memory storing the composed variational natural language generator including an encoder and a decoder, and a plurality of processor-executable instructions; and one or more processors executing the plurality-executable instructions to:

encode, by the encoder, the training sequence of tokens into an encoded sequence including a first latent variable corresponding to the first intent token and a second latent variable corresponding to the second intent token, wherein the first intent token and the second intent token are prevented from attending to each other during encoding;

compute an encoder loss based on a first conditional distribution of the first latent variable conditioned on the first intent token and a second conditional distribution of the second latent variable conditioned on the second intent token;

generate, by the decoder and from the encoded sequence, a reconstructed sequence of tokens;

compute a reconstruction loss based on a third conditional distribution of the reconstructed sequence of tokens conditioned on the first intent token, the second intent token, the first latent variable and the second latent variable;

train the composed variational natural language generator by updating parameters of the encoder and the decoder based at least in part on the encoder loss and the reconstruction loss; and generate, by the trained composed variational natural language generator, a response output in response to an input of a testing utterance.

2. The system of claim 1, wherein the encoder loss is computed based on a first KL-loss between the first conditional distribution of the first latent variable conditioned on the first intent token and a fourth conditional distribution of the first latent variable conditioned on both the first intent token and the training sequence of tokens, and a second KL-loss between the second conditional distribution of the second latent variable conditioned on the second intent token and a fifth conditional distribution of the second latent variable conditioned on both the second intent token and the training sequence of tokens.

3. The system of claim 2, wherein the reconstruction loss is computed as an expectation of a logarithm of the third conditional distribution, wherein the expectation is conditioned on the fourth conditional distribution and the fifth conditional distribution.

4. The system of claim 1, wherein input interface is further configured to:
receive an in-class training sample and an out-of-class training sample for the first intent token and the second intent token.

5. The system of claim 4, wherein the in-class training sample corresponds to the first intent token and the second intent token, and the out-of-class training sample is generated by selecting, from a set of training samples, a training sample that is similar to the in-class training sample and corresponds to an intent other than the first intent token or the second intent token.

6. The system of claim 5, wherein the selected training sample has a similarity with the in-class training sample based on a first number of shared unigrams between the selected training sample and the in-class training sample, a second number of shared bi-grams between the selected training sample and the in-class training sample, and a third number of shared uni-grams between names of intents corresponding to the selected training sample and the in-class training sample.

7. The system of claim 4, wherein the encoder is configured to:
encode the in-class training sample with the first intent token and the second intent token into a first encoded sequence, and the out-of-class training sample with the first intent token and the second intent token into a second encoded sequence, respectively; and
wherein the decoder is configured to:
generate a reconstructed in-class sample from the first encoded sequence and a reconstructed out-of-class sample from the second encoded sequence, respectively.

8. The system of claim 7, wherein the decoder is configured to sequentially generate each token in the reconstructed in-class sample or in the reconstructed out-of-class sample, and to sequentially compute a first conditional probability of the reconstructed in-class sample and a second conditional probability of a reconstructed out-of-class sample, both conditioned on the first intent token and the second token.

9. The system of claim 8, wherein the decoder is further configured to:
compute a contrastive loss by constraining a logarithm of the first conditional probability to be higher than that of the second conditional probability for at least a predefined margin.

10. The system of claim 9, wherein the encoder and the decoder are jointly trained by any combination of the encoder loss, the decoder loss and the contrastive loss.

11. A method for training a composed variational natural language generator implemented on a neural network and comprising an encoder and a decoder, the method comprising:
receiving, via an input interface, a training sequence of tokens including a first intent token and a second intent token;
encoding, by the encoder, the training sequence into an encoded sequence including a first latent variable corresponding to the first intent token and a second latent variable corresponding to the second intent token, wherein the first intent token and the second intent token are prevented from attending to each other during encoding;
computing an encoder loss based on a first conditional distribution of the first latent variable conditioned on the first intent token and a second conditional distribution of the second latent variable conditioned on the second intent token;
generating, by the decoder and from the encoded sequence, a reconstructed sequence of tokens;
computing a reconstruction loss based on a third conditional distribution of the reconstructed sequence of tokens conditioned on the first intent token, the second intent token, the first latent variable and the second latent variable;
training the composed variational natural language generator by updating parameters of the encoder and the decoder based at least in part on the encoder loss and the reconstruction loss; and
generating, by the trained composed variational natural language generator, a response output in response to an input of a testing utterance.

12. The method of claim 11, wherein the encoder loss is computed based on a first KL-loss between the first conditional distribution of the first latent variable conditioned on the first intent token and a fourth conditional distribution of the first latent variable conditioned on both the first intent token and the training sequence of tokens, and a second KL-loss between the second conditional distribution of the second latent variable conditioned on the second intent token and a fifth conditional distribution of the second latent variable conditioned on both the second intent token and the training sequence of tokens.

13. The method of claim 12, wherein the reconstruction loss is computed as an expectation of a logarithm of the third conditional distribution, wherein the expectation is conditioned on the fourth conditional distribution and the fifth conditional distribution.

14. The method of claim 11, further comprising:
receiving an in-class training sample and an out-of-class training sample for the first intent token and the second intent token.

15. The method of claim 14, wherein the in-class training sample corresponds to the first intent token and the second intent token, and the out-of-class training sample is generated by selecting, from a set of training samples, a training sample that is similar to the in-class training sample and corresponds to an intent other than the first intent token or the second intent token.

16. The method of claim 15, wherein the selected training sample has a similarity with the in-class training sample based on a first number of shared unigrams between the selected training sample and the in-class training sample, a second number of shared bi-grams between the selected training sample and the in-class training sample, and a third number of shared uni-grams between names of intents corresponding to the selected training sample and the in-class training sample.

17. The method of claim 14, further comprising:
encoding the in-class training sample with the first intent token and the second intent token into a first encoded sequence, and the out-of-class training sample with the first intent token and the second intent token into a second encoded sequence, respectively; and generating a reconstructed in-class sample from the first encoded sequence and a reconstructed out-of-class sample from the second encoded sequence, respectively.

18. The method of claim 17, further comprising:

sequentially generating each token in the reconstructed in-class sample or in the reconstructed out-of-class sample; and sequentially computing a first conditional probability of the reconstructed in-class sample and a second conditional probability of a reconstructed out-of-class sample, both conditioned on the first intent token and the second token.

19. The method of claim 18, further comprising:

computing a contrastive loss by constraining a logarithm of the first conditional probability to be higher than that of the second conditional probability for at least a pre-defined margin.

20. The method of claim 19, further comprising:

updating the composed variational natural language generator based on any combination of the encoder loss, the decoder loss and the contrastive loss.

* * * * *